(12) United States Patent
Busch et al.

(10) Patent No.: US 8,819,083 B2
(45) Date of Patent: Aug. 26, 2014

(54) CREATING NEW DATABASE OBJECTS FROM EXISTING OBJECTS

(75) Inventors: Carsten Busch, Weinheim (DE); Sabine Finke, Karlsruhe (DE)

(73) Assignee: SAP AG, Walldorf (DE)

( * ) Notice: Subject to any disclaimer, the term of this patent is extended or adjusted under 35 U.S.C. 154(b) by 1385 days.

(21) Appl. No.: 11/320,428

(22) Filed: Dec. 29, 2005

(65) Prior Publication Data
US 2007/0156754 A1 Jul. 5, 2007

(51) Int. Cl.
*G06F 17/30* (2006.01)

(52) U.S. Cl.
USPC .......................................... 707/805

(58) Field of Classification Search
CPC . G06F 17/30398; G06F 11/3664; G06F 8/10;
G06F 8/30; G06F 8/60; G06F 17/30595
See application file for complete search history.

(56) References Cited

U.S. PATENT DOCUMENTS

| | | | |
|---|---|---|---|
| 5,450,581 A * | 9/1995 | Bergen et al. ................. | 707/9 |
| 5,715,413 A | 2/1998 | Ishai et al. | |
| 5,721,900 A | 2/1998 | Banning et al. | |
| 5,832,496 A | 11/1998 | Anand et al. | |
| 5,842,195 A | 11/1998 | Peters et al. | |
| 5,848,424 A | 12/1998 | Scheinkman et al. | |
| 5,870,746 A | 2/1999 | Knutson et al. | |
| 5,930,764 A | 7/1999 | Melchione et al. | |
| 5,966,695 A | 10/1999 | Melchione et al. | |
| 6,188,404 B1 * | 2/2001 | Rekimoto ................. | 715/764 |
| 6,320,586 B1 | 11/2001 | Plattner et al. | |
| 6,587,556 B1 | 7/2003 | Judkins et al. | |
| 7,188,139 B1 * | 3/2007 | Ayatsuka et al. ............. | 709/204 |
| 2002/0140731 A1 | 10/2002 | Subramaniam et al. | |
| 2003/0110179 A1 * | 6/2003 | Barton ........................ | 707/101 |
| 2004/0230914 A1 * | 11/2004 | Arend et al. .................. | 715/804 |
| 2005/0240866 A1 * | 10/2005 | Berstis et al. ................ | 715/522 |

FOREIGN PATENT DOCUMENTS

| | | |
|---|---|---|
| EP | 0703540 | 3/1996 |
| WO | 99/45489 | 9/1999 |
| WO | 02/23428 | 3/2002 |
| WO | 01/46891 | 6/2004 |

OTHER PUBLICATIONS

Rekimoto, Jun; "Pick-and-Drop: A direct Manipulation Technique for Multiple Computer Environments", 1997, ACM, 0-89791-881-9/97/10, pp. 31-38.*

"Using Internet Explorer keyboard shortcuts," help text from Microsoft Internet Explorer version 6.0, pp. 1-3; printed on Dec. 29, 2005.

* cited by examiner

*Primary Examiner* — Dinku Gebresenbet (74) *Attorney, Agent, or Firm* — Buckley, Maschoff & Talwalkar LLC (57) ABSTRACT

A method and computer program product for performing the method are provided. The method includes receiving a first user selection of a source database object to be used in the creation of a new database object. The source database object has a first predefined database object type. The method also includes storing a reference to the selected source database object in association with a user identifier associated with the first user selection; receiving a second user selection of a second predefined database object type to be used in the creation of the new database object. The second database object type is different from the first database object type. The method also includes determining if a user identifier associated with the second user selection is stored in association with the user identifier associated with the stored reference, and if so, creating the new database object using the referenced source database object.

30 Claims, 7 Drawing Sheets

CREATING NEW DATABASE OBJECTS FROM EXISTING OBJECTS

TECHNICAL FIELD

This description relates to manipulating data using a graphical user interface in which the data is related to a software application running on a computer system accessible through a network.

BACKGROUND

For most businesses, effective, streamlined management of corporate data, for example customer databases, is a substantial issue and becomes quite complex when multiple software programs, operating systems, and computer platforms are involved. Typically, if a user wishes to transfer data from, for example, a customer relations management (CRM) software program to a financial management (FM) software program, the user is limited to copy/paste functions contained in the operating system (OS) software, in which relatively limited data may be selected in the source program and subsequently transferred to the target program without further options. Similarly, drag/drop methods allow a user to share relatively limited information between concurrently running software programs by using a pointing device that selects information and transfers it to a target program. Import/export functionality is built in to most database management software programs, however, this feature has limitations in that the files to be imported must meet certain criteria for successful incorporation into the target program, or are altogether program-specific.

A common means of data management in business applications is in the form of predefined "object types," wherein a given object type may contain one or more predefined "database objects." Within an opportunity object type, there may be certain specific database objects, and within the database objects, there may be individual fields which form the object. An example of a predefined object type may be an "opportunity" object type. Opportunities may contain business-related information about sales or certain opportunities of which a user wishes to be informed. An opportunity may contain database objects such as specific information about a company and their business practices, or information about clients that may be potential customers. The individual fields within the database objects can include information such as customer name, phone number, and address.

Transferring opportunity or database objects between the same or differing applications can be a daunting task if individual database objects must be individually selected, copied, and pasted from one location to another. The aforementioned copy/paste, drag/drop, and import/export functions lack dynamic control of data during the paste/drop/import phase, in that the data gets incorporated into the target program "as is" (typically from the "clipboard"), and the user must then modify this data manually. A method of data transferal allowing users to share data information between the same or different software programs and software operating systems, and with the ability to dynamically modify incoming data to the target location would be highly beneficial toward efficient corporate data management practices.

SUMMARY

In one aspect, this document discloses a computer implemented method of creating a database object using an existing database object. The method includes receiving a first user selection of a source database object to be used in the creation of a new database object. The source database object has a first predefined database object type. The method also includes storing a reference to the selected source database object in association with a user identifier associated with the first user selection; receiving a second user selection of a second predefined database object type to be used in the creation of the new database object. The second database object type is different from the first database object type. The method also includes determining if a user identifier associated with the second user selection is stored in association with the user identifier associated with the stored reference, and if so, creating the new database object using the referenced source database object.

In various implementations of the computer implemented method, one or more of the following features may be included. The source object may have fields with values associated with the fields, and the new database object may include the fields and the values of the source object. The reference created to the user selected source database object and the user that selected the source database object may be stored in a temporary server-side data repository. The first user selection may be made by the user using a data input device under the guidance of a displayed user interface window that shows an indication of the source database object. The second user selection may be made in the same manner by the user, under the guidance of a displayed user interface window having a list view of database objects of the second type. The functionality of the computer implemented method may be independent of computer operating system, web browser interface, or enterprise software application.

In addition, the computer implemented method may also include presenting on a display device for the user, a user interface window containing options for actions to be taken on data from the referenced source database object that is to be included in the new database object. These options may include, for example, an option to modify data from the referenced source database object for the purposes of the new application database object. The user may perform actions on the referenced source database objects, such that the referenced source database objects may be transferred to other users, or otherwise "tagged" with an appropriate status, such as "alert".

In another aspect, a computer program product is provided that is tangibly embodied on an information carrier, such as computer program memory. The computer program product comprises program instructions that when executed perform the above-described methods of creating a database object using an existing database object.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
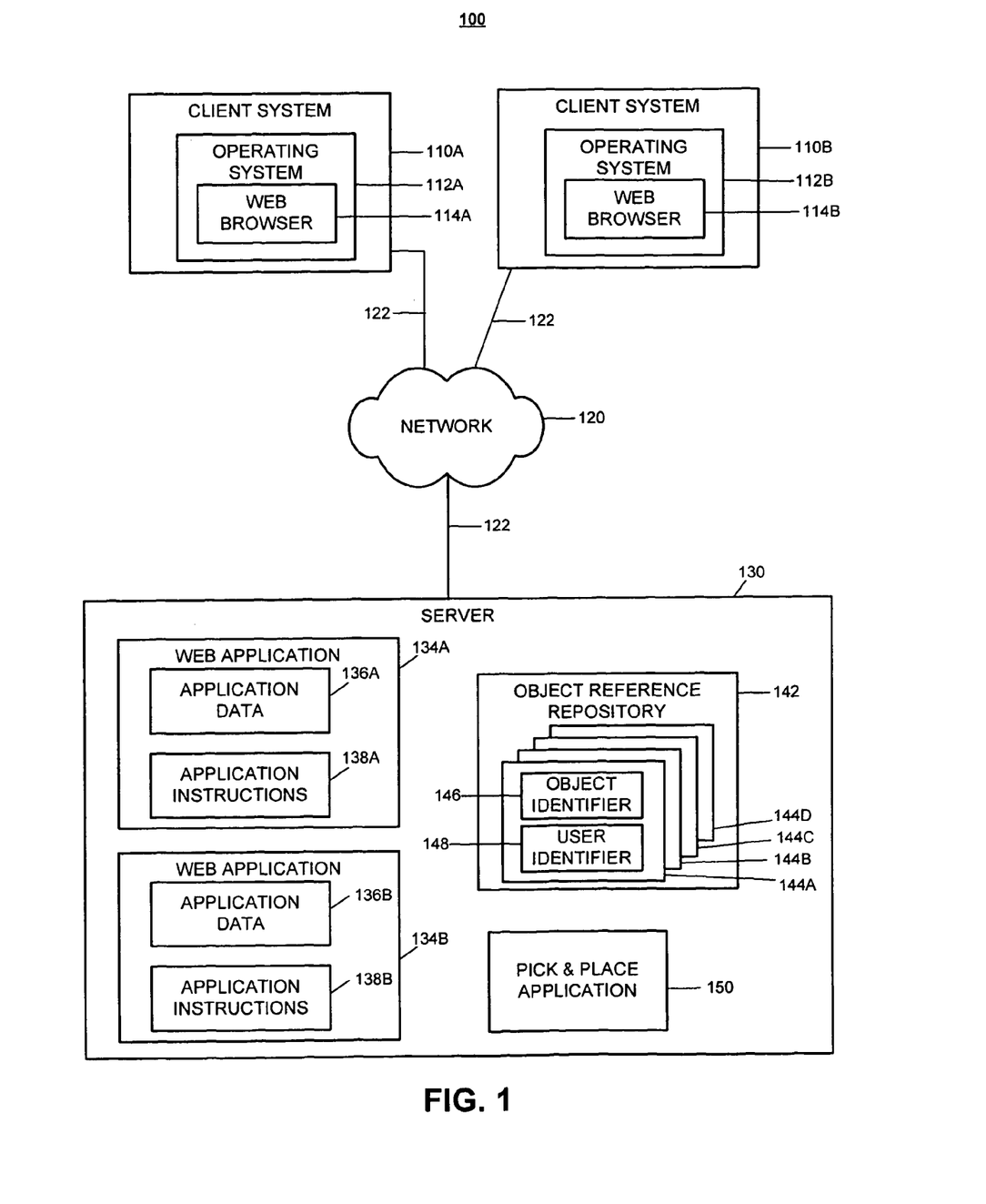
FIG. 1 is a block diagram of a system incorporating various aspects of the invention.

FIG. 1 is a simplified block diagram of an enterprise computing system 100, in which computer program products and methods for copying computer application data from one software application to another can be used. In this example, the computing system 100 includes a server 130, on which two software web applications 134A and 134B reside. Each application has its own separate application data 136A and 136B, respectively, that is accessible by the associated application and, in this case, not the other application. The server 130 in FIG. 1 is accessible via network 120 by various client systems that are able to access and make use of the server-based web applications 134A and 134B. Two such client systems are shown in FIG. 1, namely, client systems 110A and 110B. Although only two such client systems are shown in FIG. 1, there may be, and typically will be, many more client systems. Generally, users are able to use one of the client systems and easily select, or "pick," data from the application data 136A of one application 134A, and then easily copy, or "place," that application data (after revising the data, if desired) to the application data 136B of the other application 134B. As such, this general approach may be referred to as a "pick and place" technique.

The server-based web applications 134A and 134B, in this example, are functionally different software applications, and may be, for example, software programs typically used in business applications for which the ability to transfer application data 136A and 136B from one application to the other would be beneficial to the user. For example, the web application 134A may be a customer relationship management (CRM) application that is used to manage interactions of the enterprise with its customers, and the other web application 134B may be a financial management (FM) application. The FM application, for example, may need to make use of application data stored in the CRM application for a variety of reasons, for example, in preparing invoices to a customer and in accounting for costs incurred in providing services to a customer. In another example, the web application 134A may be an email application such as Microsoft® Office Outlook®, and the other web application 134B may be a spreadsheet application such as Microsoft® Office Excel®.

The software applications 134A and 134B each include stored application instructions (138A and 138B, respectively) that are made up of executable program instructions that are executed by a processor (not shown in FIG. 1) residing, for example, within the server 130. The execution of the software instructions causes various operations to be performed. The application data 136A and 136B mentioned previously may reside in memory within the server 130, as shown in FIG. 1, and may be organized in file folders having predefined associations with particular software applications. Alternatively, the application data 136A and 136B may reside in a separate database system although accessible by the server-based applications 134A and 134B and known by the application where the application data may be accessed.

The server 130 also includes a server-based pick and place software application 150 which is accessed and used by the client systems 110A and 110B in carrying out the pick and place process. The pick and place software application 150 is made up of executable program instructions that are executed by a processor (not shown in FIG. 1) residing, for example, within the server 130. The execution of the software instructions causes various operations to be performed in carrying out the pick and place process, which will be described in more detail later.

In addition, the server 130 includes a temporary application data storage area 142 in which application data are temporarily stored during a pick and place process. In the example shown in FIG. 1, the application data shown temporarily stored in storage area 142 are object references, which is a reference to the application data 136A and 136B, which may be object data, where each object may have one or more attributes and values for the attributes. FIG. 1 shows a number of object references 144A through 144D temporarily stored in the temporary storage area 142. Each object reference 144(A-D) includes an object identifier 146, which is a unique identifier that identifies the particular data object and the application, such as application 134A or application 134B, in which the data object may be found. In addition, each object reference 144(A-D) includes a user identifier 148 that identifies the user of the pick and place operation for which the object reference 144A is being temporarily stored.

Figure 2:
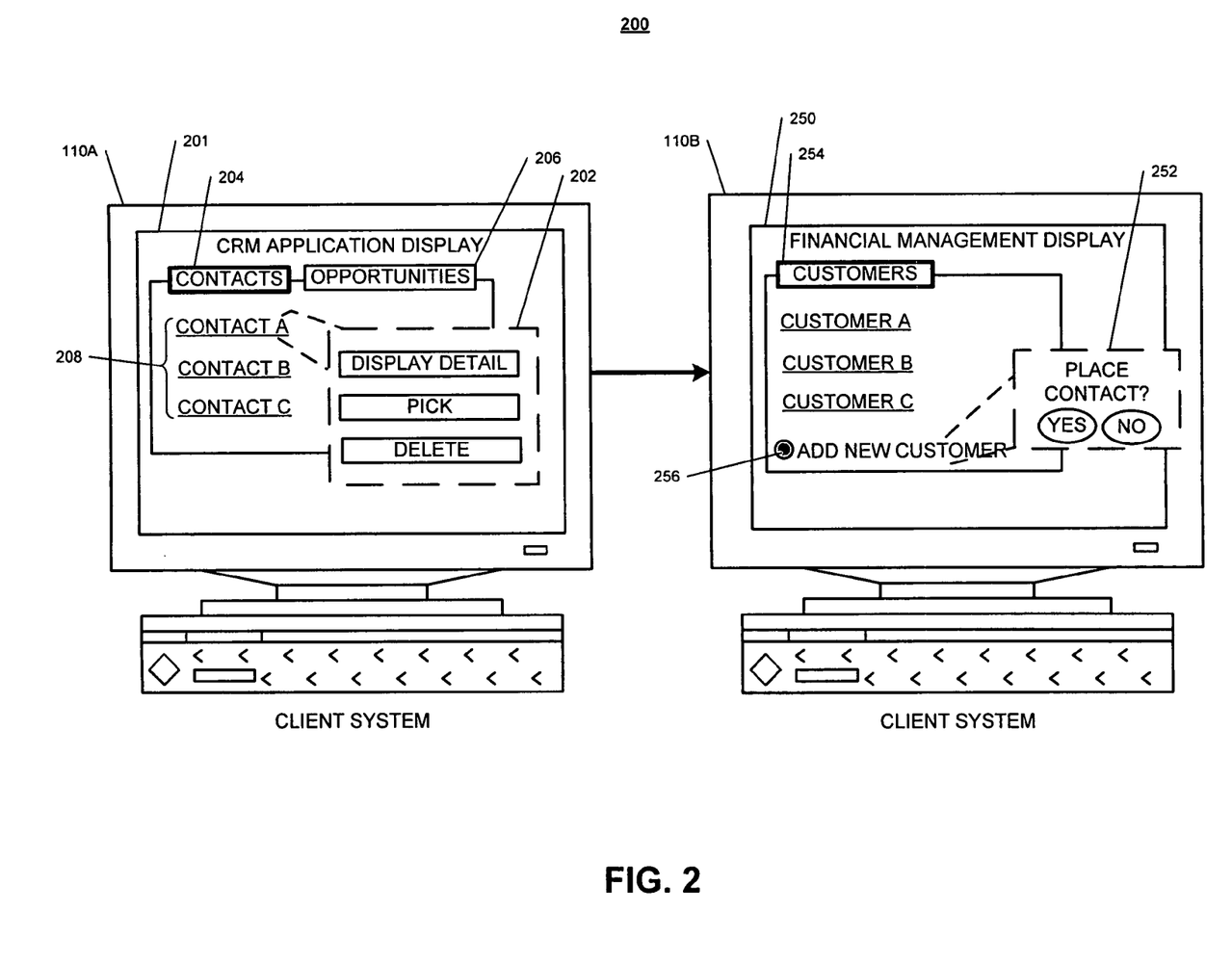
FIG. 2 shows two displays on a client system that shows a pick and place method.
Figure 3:
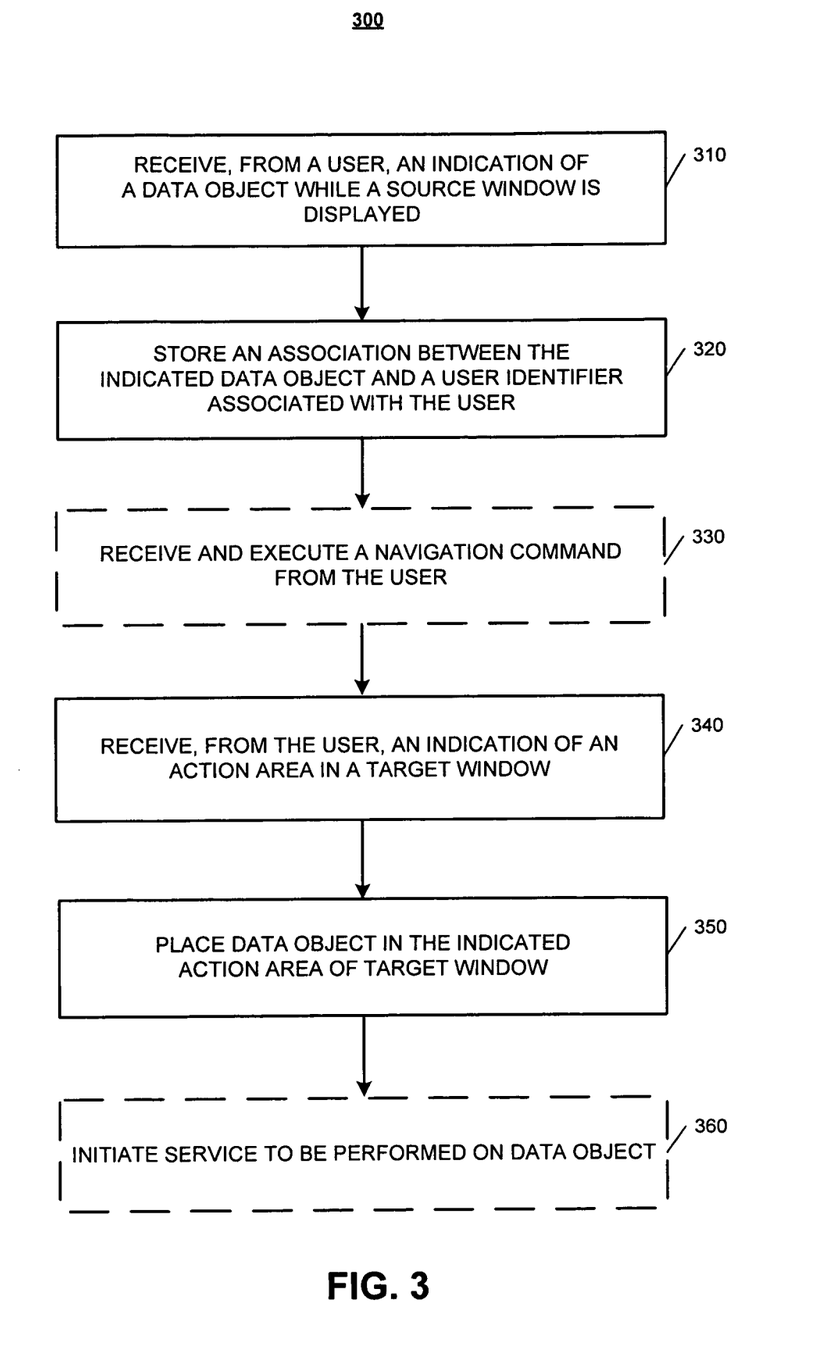
FIG. 3 is a flow chart of an example pick and place method.

The client systems 110A and 110B each include an operating system 112A and 112B, respectively, and a web browser 114A and 114B, respectively. In one example, the operating systems 112A and 112B on different client systems may be different operating systems, such as Microsoft® Windows XP and Microsoft®V Windows 95. In addition, the web browsers 114A and 114B may also be different on different client devices, for example one may be Microsoft® Internet Explorer and the other Netscape® Navigator. FIG. 2 shows two display windows in client devices 110A and 110B that illustrate the pick and place process as it may be performed, for example, in the example system 100 shown in FIG. 1. FIG. 3 is a flow chart of the pick and place process for which two screen snapshots are shown in FIG. 2.

In FIG. 2, the client device 110A is shown on the left side of FIG. 2 displaying a first display window 201 of the first application 134A, which in this example is a CRM application, with a first pop-up display window 202 which is used in the "pick" part of the process. On the right side of FIG. 2, the client device 110B is shown displaying a second display window 250 of the second application 134B, which in this example is a financial management (FM) application, with a second pop-up display window 252 used in the "place" part of the process.

The CRM application display window 201 is a type of window that may be referred to as a "list view" display window, because it displays a list of certain database objects stored in application data. The CRM list view window 201 in this example includes two user-selectable tabs, "CONTACTS" 204, and "OPPORTUNITIES" 206. CONTACTS may represent, for example, contacts that are stored in the CRM application data, and OPPORTUNITIES may represent, for example, possible sales transactions or opportunities.

The CONTACTS tab 204 is shown selected in FIG. 2, and as such, shown below the tabs 204 and 206 is a list 208 of three contacts, "CONTACT A," "CONTACT B," and "CONTACT C." The listed contacts in FIG. 2 are identifiers for three CONTACT database objects stored in the application data 136A of the first software application 134A, which in this case is a CRM application. The contact database objects stored in the application data 136A may include separate database fields for a company name, address, and a contact person at the company, for example. Typically, not all of the contact database objects stored in the application data 136A will be included in a displayed list 208. For example, the list 208 may be filtered for a particular user, and thus list only the sales opportunities applicable to that user. Also, a search routine may be used to generate a list view of database objects that meet certain search criteria.

If the OPPORTUNITIES tab 206 were selected (which is not the case in FIG. 2), the list 208 below the tabs 204 and 206 would display a list of sales opportunities. Sales opportunities, like contacts, may also be database objects stored in the application data 136A. The sales opportunity database objects may include separate fields for information about the sales opportunity, such as, for example, when the opportunity arose, and the products and quantity that are the subject of the sales opportunity. Opportunity database objects may also include, as a field, a contact, which may be one of the contact database objects. In operation of the CRM application 134A, a user may use a pointing device to select one of the listed CONTACTS, such as CONTACT A. Upon doing so, the CRM application 134A may respond by causing the display of an "object view" window (not shown in FIG. 2) that shows database field information for the selected CONTACT database object.

The FM application window 250 is, like the CRM application window 201, also a list view display window. In this example FM application 134B, the database objects are called "CUSTOMERS." As such, the FM application list view includes a CUSTOMERS tab 254 that may be selected to generate a list of CUSTOMER database objects stored in the second application's application data 136B. Like the CONTACT database objects of the CRM application 134A, the CUSTOMER database objects for the FM application 134B may include, for example, a company name, an address for the company, and a contact person at the company.

Oftentimes, a user may wish to incorporate database objects stored in application data 136A from one application 134A into application data 136B of another application 134B. Similarly, database objects within the same application data 136A may need to be copied or re-associated such that they may be accessed by another list view window, for example relating CONTACT A from the CONTACTS list view 208 to an opportunity within the OPPORTUNITIES list view. The purpose of the pick and place software is to provide this type of functionality, including the ability to perform further actions on, or modify, picked database objects, utilizing a minimum of user actions.

Within the list view display window 201, a user picks, or selects, a database object stored in application data 136A using a pointing device, keyboard input, a combination of inputs, or any other method. The action of picking the database object causes software application instructions 150 to be executed by the server system 130, the first of which is receiving an indication of a database object that has been picked. The picking of a database object generates, within display window 201, a pop-up window 202 containing various user options. In this case "DISPLAY DETAIL", "PICK", and "DELETE", are indicated as user options in the pop-up window 202. Choosing the PICK option causes a new object reference 144A to be created. This new object reference 144A includes a database object identifier 146, which identifies, for example, the CONTACT A database object 208 from the CRM application data 134A. In addition, the object reference 144A also includes a user identifier 148 which correlates the new object reference 144A to the originator of the pick and place command. One example of a user identifier 148 may be a correlation between the database object 136A and a unique client system IP address from which the pick function was initiated. Alternatively, the association could comprise a correlation between the database object 136A and a particular user, or a link between the database object 136A and a particular network client system 110(A-B). The stored object reference 144A and data therein 146, 148, may be temporarily or persistently stored utilizing common means of data storage, for example, random access memory (RAM) or a hard-disk drive.

The user may then perform intra- or inter-application navigation so as to display the target destination for the picked database object 136A. For example, if the user wished to incorporate certain fields of a database object 136A pertaining to CONTACT A from the CONTACTS list view 208 into the OPPORTUNITIES list view (not shown) of the CRM display window 201, the user would navigate to the OPPORTUNITIES list view by selecting the OPPORTUNITIES tab 206. However, the user may switch to an entirely different application 134B, such as by switching to the FM application display window 250 (as indicated by the dark arrow pointing from the CRM display window 201 to the FM display window 250 in FIG. 2). The second application 134B that will ultimately receive the picked database object need not be running at the time the database object was picked within the originating application 134A.

To place the picked database object, the user navigates to an appropriate action area of the screen, which in this example is an ADD NEW CUSTOMER field 256 on the CUSTOMERS list view 254 in the FM application display window 250 in FIG. 2. The user then performs an action on the ADD NEW CUSTOMER field 256 of the display window 250 by mouse, keyboard, or other input, causing a pop-up window 252 to be displayed. As such, field 256 may be referred to as an "action area." The pop-up window is a confirmation window that asks, in essence, "is it here where you want to place the data object you picked—yes or no?" Choosing the option to place the picked database object 136A causes the server 130 to execute pick and place instructions 150 so as to place the picked database object 136A into application data of the target display window 250. In this example, the database object 136A associated with CONTACT A 208 would be added as a new customer database object within the application data 136B in the FM application display 250.

A brief reiteration of the pick and place process 300 from the standpoint of server 130 and client system 110(A-B) data intercommunication is presented as a flow diagram in FIG. 3. First, at step 310, an indication of a data object 136A, selected by the user, is received by the server 130 while the user's source window is displayed. The source window may be, for example, the application display window 201. Next, at step 320, the server 130 executes pick and place application instructions 150 to store an association between the indicated data object 136A and a user identifier 148 associated with the user. The association may be stored, for example, as an object reference 142, that includes the object identifier 146 and the user identifier 148.

The user may optionally then display a different application display window (such as an FM application display window 250 shown in FIG. 2) from that which was displayed during the pick process. If navigating to a different application display window, the server system 130 receives, at step 330, navigation commands from the user to display a desired application display window. The user is now viewing an application display window (for example, window 250 in FIG. 2), into which the picked database object 136A will be incorporated (the "target window"). Next, at step 340, the server system 130 receives an indication of an action area (for example 256 in FIG. 2) in the target window from the user which indicates the area that the picked database object will be placed. The server system 130 then, at step 350, places the database object in the indicated action area of the target window as new application data 136B. At step 360, the user may optionally perform additional services on the newly-placed database object 136B, such as adding, deleting, or modifying elements of the database object 136B.

Figure 4:
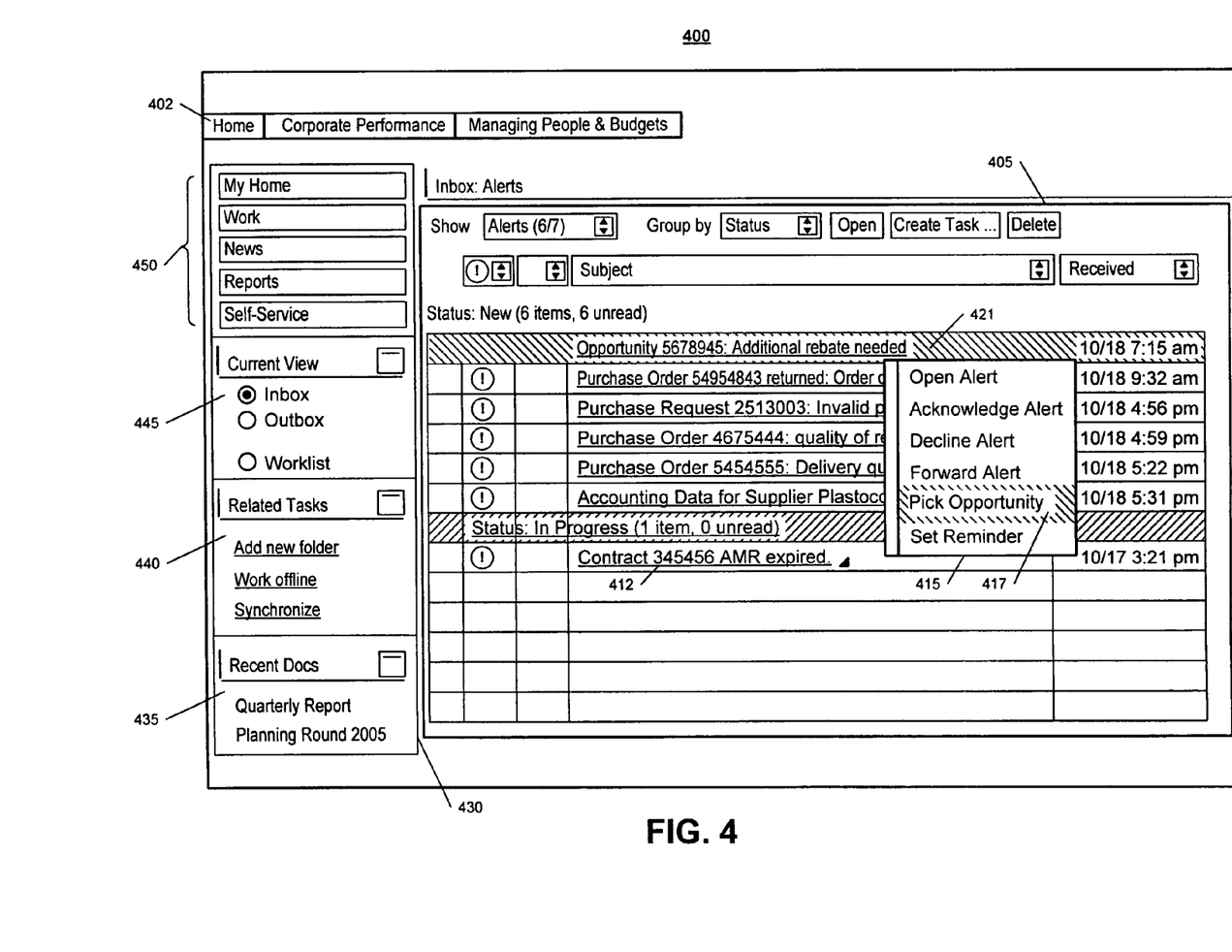
FIG. 4 is an example screen snapshot of a pick action.
Figure 5:
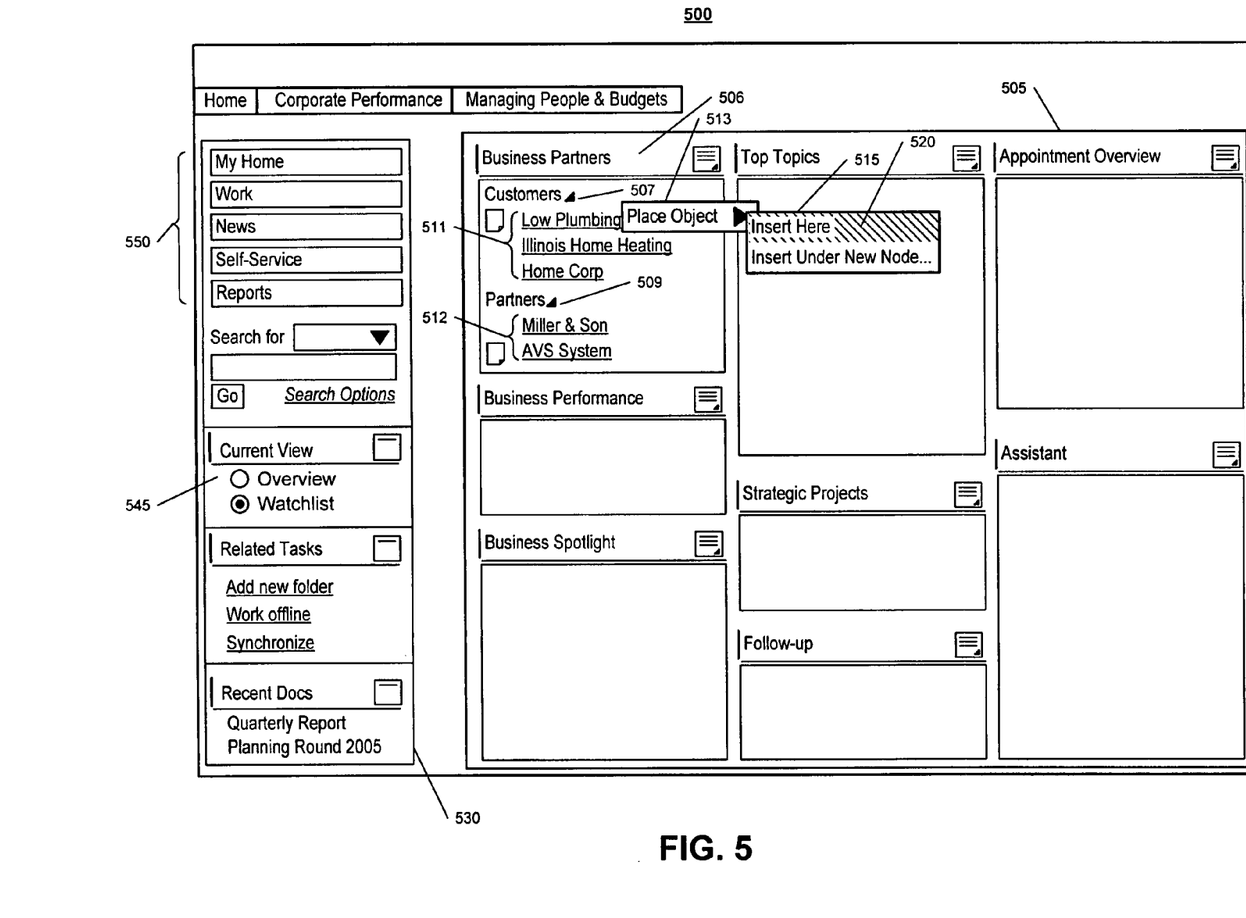
FIG. 5 is an example screen snapshot of a place action following the pick action shown in FIG. 4.
Figure 6:
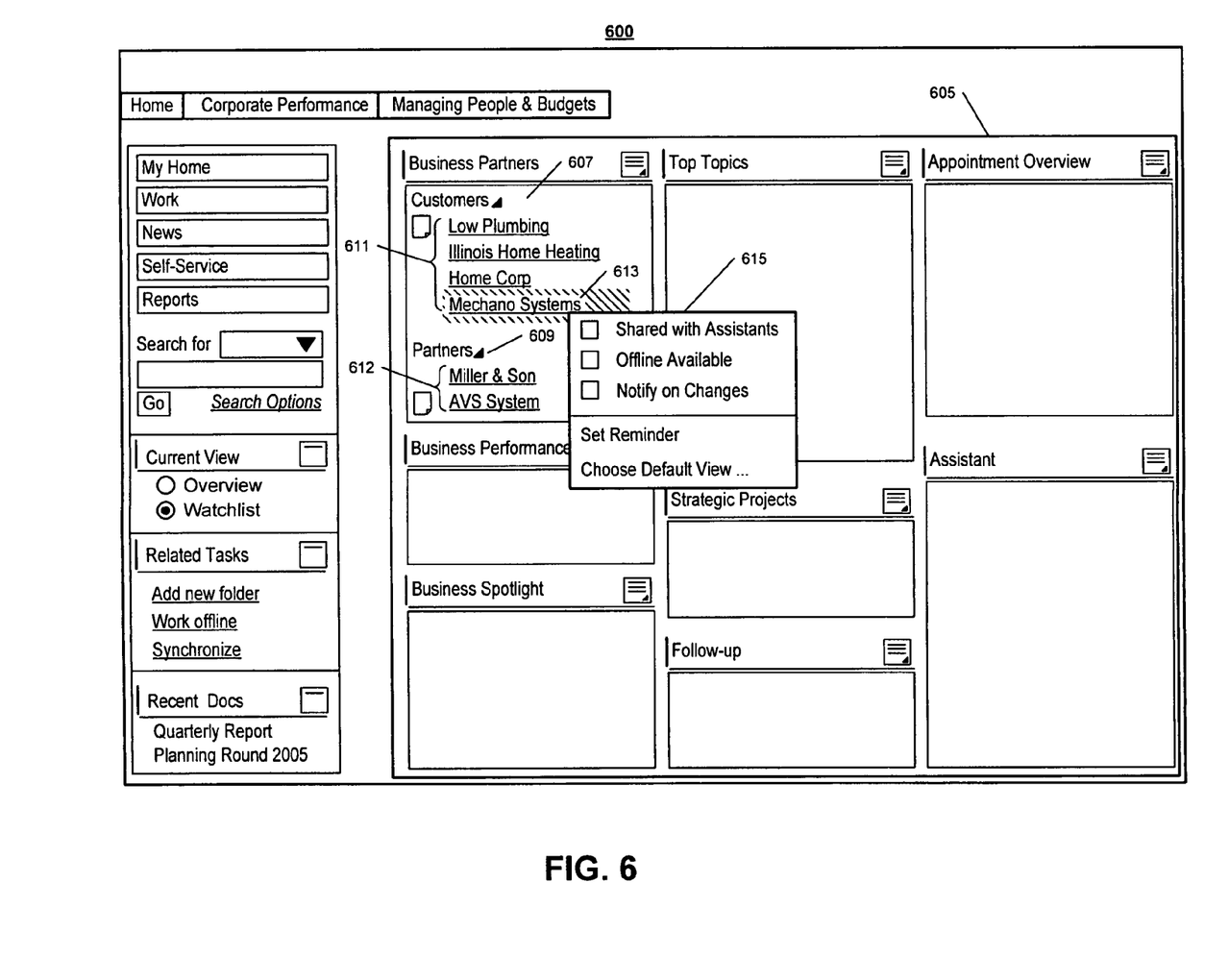
FIG. 6 is an example screen snapshot of further actions on the placed database object of FIG. 5.

FIGS. 4-6 show the applicability of the pick and place software program 150 for a particular implementation and shows an example of how a database object can be further modified or acted upon after being copied from its original location. The user interface in FIGS. 4-6 represents an example CRM application showing an inbox of sales order alerts that are to be viewed and perhaps acted upon by a user. FIG. 4 shows an application screen snapshot of a display window 400 for an example CRM application. Within the main display window 400 is a smaller display window 405 in which the user can view various database objects 412 by selecting the appropriate fields from a navigation frame 430 on the left side of the display window 400. The application display window 400 contains three user-selectable tabs 402 which control the content of the active display window 405 and the navigation frame 430. This particular set of user-selectable tabs 402 allow the user to show "Home", "Corporate Performance", and "Managing People & Budgets" display windows respectively. The "Home" user-selectable tab 402 contains navigation frame elements 430 allowing users to customize the active display window 405 to suit their needs.

Global user-selectable action areas (for example the navigation tabs 402) control global application options for the user, largely dictating the screen content visible to the user. For example the "Home" tab 402 has been selected in this application screen snapshot. Consequently, this has caused the display windows to appear as shown, for example, navigation options 450, "Current View" 445 selector, "Related Tasks" 440, containing options for application instructions, and "Recent Docs" 435 which contains links to documents recently accessed. In this case, the user has selected the "Inbox" radial checkbox within the "Current View" 445 options, which shows database objects 412 within the active display window 405. Several classes of database object "Alerts" 412 are listed in the active window 405, including an opportunity, purchase orders, and accounting data.

In the following example illustrated by the application screen snapshots of FIGS. 4-6, the user wishes to select a particular opportunity from the list of "Alerts" 412 and add the database object to application data within the same program application. The user has caused the server to execute pick and place software application instructions by implementing the pick function on an action area of the display window 400 containing a selected database object "Opportunity 5678945: Additional rebate needed" 421. Doing so has caused a pop-up window 415 to be displayed. The pop-up window 415 contains several options for the picked alert database object 421. The user can select from the pop-up window 415 various actions to be performed on the alert, such as open, acknowledge, decline, or forward the alert. In addition, the user can select a "Pick Opportunity" indicator 417, which is part of a pick and place process. In the FIG. 4 example, the user has selected the "Pick Opportunity" option 417 (shown shaded). Upon the server receiving this command, the server creates an object reference for the selected database object 421 that contains 1) an object identifier 146 associated with the selected database object 421, and 2) a user identifier 148 relating the reference to the user. With this object reference 144A created, the database object 421 has been picked.

FIG. 5 is a screen snapshot 500 from the same software application as FIG. 4; however, in this case the user has selected "My Home" from a list of global views 550. This selection has changed some of the layout and content of an application window 505. Navigable frame links 530 are shown of the same type as FIG. 4; however, in this case the user has selected the "Current View" 545 as "Watchlist," which causes the content in the active display window 505 to be different from that in FIG. 4. The user has thus navigated to a new display window 505.

The active display window 505 contains sub-display windows which contain typical "watchlist" areas of interest. One of the displays is titled "Business Partners" 506 and contains sub-headings for "Customers" 507 and "Partners" 509; each sub-heading 507, 509 contains "business partner" type database objects 511, 512 of "Customers" or "Partners", respectively. For example, a database object under the "Customers" 507 heading may contain database elements of customer information such as a name, address, and phone number of an individual. Likewise, "Partners" 509 database objects 512 may contain similar information about individuals in business collaboration with the user. Both "Customers" and "Partners" in this example use the same "business partner" database object model.

In this example, the user wishes to add the picked "opportunity"-type database object 421 from FIG. 4 as a new "business partner"-type database object 511 in the action area "Customers" 507. The user has performed an action on the action area which caused the server 130 to execute pick and place software instructions 150 and present the user with a pop-up window dialog box 513. The dialog box 513 offers the option to place the stored database object 421 via two commands contained in a secondary dialog box 515, through either an "Insert Here" or "Insert Under New Node . . . " option. The user has selected "Insert Here" 520 as evidenced by the shaded portion of the dialog box 515. The instruction to place the database object 421 by the pick and place software 150 is received and executed by the server 130 when the user selects the "Insert Here" 520 option. These commands add the picked database object 421 to the list of "Customers" 511 as new application data in the application, by creating a new "business partner"-type database object from an "opportunity"-type database object. This process is completed without the user having to manually create a new database object and fill in the field information of that database object by cut and paste methods, for example.

FIG. 6 is an application display window screen snapshot 600 of the same program application 134A as FIG. 5, after the place function has been executed. The sub-display window "Customers" 607 now shows a new customer, "Mechano Systems" 613, in the list of database objects 611; thus, the picked database object 421 has now been placed as a new database object 613 and has been added to application data for the "Customers" group 607.

FIG. 6 shows a pop-up window display 615 that has been generated as a result of the user performing a predefined action on the action area 613 of the newly-placed database object 613. This window 615 provides the user with options for executing further pick and place instructions relating to the placed database object 613. The user can share the new opportunity with assistants, for example, by simply checking the "Shared with Assistants" box in the pop-up window 615, the opportunity could be e-mailed to a list of assistants without the need to select and copy the data, open an e-mail software program, begin a new message, assign addressees, paste the opportunity, and send the message. Other options may include the ability to work on, or modify the elements of the database object 613 while a client system 110 is offline, notify the user if changes are made to the elements of the database object 613, set a reminder in regard to some facet of the customer relationship, or define a default view for viewing the elements of the database object 613.

Figure 7:
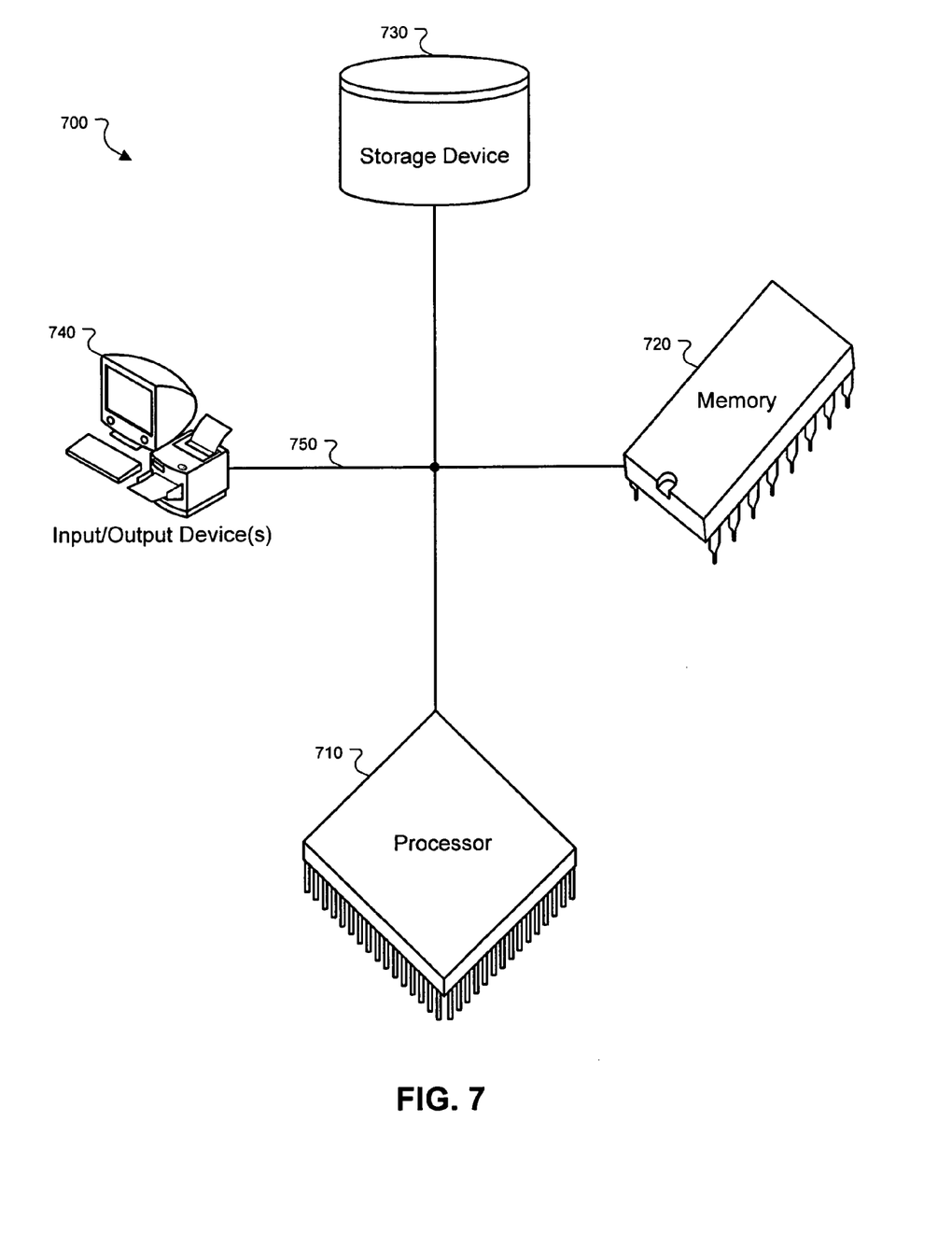
FIG. 7 is a block diagram of a computing system that may be used in connection with the preceding figures.

FIG. 7 is a block diagram of a general computer system 700 that could be used in the operations described above, according to one embodiment. The system 700 includes a processor 710, a memory 720, a storage device 730 and input/output devices 740. Each of the components 710, 720, 730 and 740 are interconnected using a system bus 750. For example, any GUI abstraction shown or described herein can be generated on the input/output device 740.

The processor 710 is capable of processing instructions for execution within the system 700. In one embodiment, the processor 710 is a single-threaded processor. In another embodiment, the processor 710 is a multi-threaded processor. The processor 710 is capable of processing instructions stored in the memory 720 or on the storage device 730, including for receiving or sending information through the input/output device 740.

The memory 720 stores information within the system 700. In one embodiment, the memory 720 is a computer-readable medium. In one embodiment, the memory 720 is a volatile memory unit. In another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one embodiment, the input/output device 740 includes a keyboard and/or pointing device. In one embodiment, the input/output device 740 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. The interaction with a user also may be implemented through use of voice recognition software. The ability of a user to interact through keyboard input and/or voice recognition software may be particularly useful for visually impaired users and may help improve accessibility. In some implementations, a user may be able to interact through keyboard input entirely.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the invention have been described. Nevertheless, it will be understood that various modifications may be made without departing from the spirit and scope of the invention. Accordingly, other implementations are within the scope of the following claims.

What is claimed is:

1. A computer implemented method of creating a database object using an existing database object, comprising:
    receiving, from a first user, a selection of a source database object in a first application, the source database object having a first predefined database object type of a first database management system;
    storing a reference to the selected source database object in association with a user identifier associated with the first user;
    receiving an indication to create a new database object in a second application based on the source database object and on a second predefined database object type of the first database management system, the second database object type being different from the first database object type;
    determining if a user from whom the indication was received is associated with the user identifier associated with the stored reference; and
    if the user from whom the indication was received is associated with the user identifier associated with the stored reference, creating the new database object of the second predefined database object type in the second application using the referenced source database object.

2. The computer implemented method of claim 1, wherein the source object includes fields having values associated with the fields, and the new database object includes the fields and the values.

3. The computer implemented method of claim 1, wherein the reference to the selected source database object and the user identifier are stored in a temporary server-side data repository.

4. The computer implemented method of claim 1, wherein the selection is made by the first user using a data input device under the guidance of a displayed user interface window showing an indication of the source database object.

5. The computer implemented method of claim 4, wherein the indication is made by the first user using a data input device under the guidance of a displayed user interface window having a list view of database objects of the second type.

6. The computer implemented method of claim 1, wherein the indication is made by the first user using a data input device under the guidance of a displayed user interface window having a list view of database objects of the second type.

7. The computer implemented method of claim 1, further comprising presenting on a display device for the first user, a user interface window containing options for actions to be taken on data from the referenced source database object that is to be used in creating the new database object.

8. The computer implemented method of claim 7, wherein the options include an option to modify data from the referenced source database object for the purposes of creating the new database object.

9. The computer implemented method of claim 7, wherein the user performs actions on the referenced source database object, such that the referenced source database object is transferrable to other users.

10. The computer implemented method of claim 1, where the functionality of the method is independent of computer operating system, web browser interface, or enterprise software application.

11. A non-transitory computer-readable medium comprising executable instructions that, when executed, cause a system to perform the following operations:
    receiving, from a first user, a selection of a source database object in a first application, the source database object having a first predefined database object type of a first database management system;
    storing a reference to the selected source database object in association with a user identifier associated with the first user;
    receiving an indication to create a new database object in a second application based on the source database object and on a second predefined database object type of the first database management system, the second database object type being different from the first database object type;
    determining if a user from whom the indication was received is associated with the user identifier associated with the stored reference; and
    if the user from whom the indication was received is associated with the user identifier associated with the stored reference creating the new database object of the second predefined database object type in the second application using the referenced source database object.

12. The computer-readable medium of claim 11, wherein the source object includes fields having values associated with the fields, and the new database object includes the fields and the values.

13. The computer-readable medium of claim 11, wherein the reference to the selected source database object and the user identifier are stored in a temporary server-side data repository.

14. The computer-readable medium of claim 11, wherein the selection is made by the first user using a data input device under the guidance of a displayed user interface window showing an indication of the source database object.

15. The computer-readable medium of claim 14, wherein the indication is made by the first user using a data input device under the guidance of a displayed user interface window having a list view of database objects of the second type.

16. The computer-readable medium of claim 11, wherein the indication is made by the first user using a data input device under the guidance of a displayed user interface window having a list view of database objects of the second type.

17. The computer-readable medium of claim 11, further comprising presenting on a display device for the first user, a user interface window containing options for actions to be taken on data from the referenced source database object that is to be used in creating the new database object.

18. The computer-readable medium of claim 17, wherein the options include an option to modify data from the referenced source database object for the purposes of creating the new database object.

19. The computer-readable medium of claim 17, wherein the user performs actions on the referenced source database object, such that the referenced source database object is transferrable to other users.

20. The computer-readable medium of claim 11, where the functionality of the method is independent of computer operating system, web browser interface, or enterprise software application.

21. Apparatus comprising:
   at least one programmable processor executing instructions to perform a method that includes:
   receiving, from a first user, a selection of a source database object in a first application, the source database object having a first predefined database object type of a first database management system;
   storing a reference to the selected source database object in association with a user identifier associated with the first user;
   receiving an indication to create a new database object in a second application based on the source database object and on a second predefined database object type of the first database management system, the second database object type being different from the first database object type;
   determining if a user from whom the indication was received is associated with the user identifier associated with the stored reference; and
   if the user from whom the indication was received is associated with the user identifier associated with the stored reference, creating the new database object of the second predefined database object type in the second application using the referenced source database object.

22. The apparatus of claim 21, wherein the source object includes fields having values associated with the fields, and the new database object includes the fields and the values.

23. The apparatus of claim 21, wherein the reference to the selected source database object and the user identifier are stored in a temporary server-side data repository.

24. The apparatus of claim 21, wherein the selection is made by the first user using a data input device under the guidance of a displayed user interface window showing an indication of the source database object.

25. The apparatus of claim 24, wherein the indication is made by the first user using a data input device under the guidance of a displayed user interface window having a list view of database objects of the second type.

26. The apparatus of claim 21, wherein the indication is made by the first user using a data input device under the guidance of a displayed user interface window having a list view of database objects of the second type.

27. The apparatus of claim 21, wherein the method further includes presenting on a display device for the first user, a user interface window containing options for actions to be taken on data from the referenced source database object that is to be used in creating the new database object.

28. The apparatus of claim 27, wherein the options include an option to modify data from the referenced source database object for the purposes of creating the new database object.

29. The apparatus of claim 27, wherein the user performs actions on the referenced source database object, such that the referenced source database object is transferrable to other users.

30. The apparatus of claim 21, where the functionality of the method is independent of computer operating system, web browser interface, or enterprise software application.

* * * * *